United States Patent [19]

Haga

[11] Patent Number: 5,322,485

[45] Date of Patent: Jun. 21, 1994

[54] INTERNALLY MESHING PLANETARY GEAR STRUCTURE

[75] Inventor: Takashi Haga, Ohbu, Japan

[73] Assignee: Sumitomo Heavy Industries Ltd., Tokyo, Japan

[21] Appl. No.: 995,415

[22] Filed: Dec. 18, 1992

[30] Foreign Application Priority Data

Dec. 24, 1991 [JP] Japan ................................. 3-356175
Dec. 26, 1991 [JP] Japan ................................. 3-357544
Jan. 17, 1992 [JP] Japan ................................. 4-026260

[51] Int. Cl.$^5$ ............................................. F16H 1/32
[52] U.S. Cl. ..................................... 475/178; 475/162
[58] Field of Search ................................ 475/162, 178

[56] References Cited

U.S. PATENT DOCUMENTS

| 1,578,965 | 3/2926 | Eck | 475/178 X |
| 1,673,838 | 6/1928 | Mackenzie | 475/178 |
| 3,129,611 | 4/1964 | Lee | 475/162 X |
| 4,407,170 | 10/1983 | Fukui | 475/162 X |
| 4,594,915 | 6/1986 | Braren | 475/178 X |
| 4,846,018 | 7/1989 | Matsumoto et al. | 475/178 X |
| 4,898,065 | 2/1990 | Ogata et al. | 475/178 X |
| 5,178,046 | 1/1993 | Matsumoto et al. | 475/178 X |

FOREIGN PATENT DOCUMENTS 63-243548 10/1988 Japan ................................. 475/178

Primary Examiner—Dirk Wright
Attorney, Agent, or Firm—Nikaido, Marmelstein, Murray & Oram

[57] ABSTRACT

An internally meshing planetary gear structure is the type having a first and second supporting blocks. The supporting blocks are rigidly connected to each other by carrier pins passing through inserting-fit holes formed on externally toothed gears. Also, the end surfaces of the carrier pins are exposed on a counter-member mounting surface of the first supporting block positioned on the counter-member side, and thus screw holes for screwing counter-member fixing bolts are formed on the end surfaces. With this arrangement, it is possible to enlarge the actual usable area of a counter-member mounting surface of the first supporting block and hence to increase the number of counter-member fixing bolts.

2 Claims, 7 Drawing Sheets

INTERNALLY MESHING PLANETARY GEAR STRUCTURE

BACKGROUND OF THE INVENTION

1. Field of the Invention

The present invention relates to an internally meshing planetary gear structure suitable for a reduction gear or a step-up gear, and particularly, for a reduction gear or a step-up gear requiring a high output with the small size.

2. Description of the Prior Art

The conventional internally meshing planetary gear structures have disclosed in, for example, Japanese Patent Laid-open No. sho 60-260737, U.S. Pat. No. 3,129,611 and the like. In such a gear structure, a casing is provided, and the tip of a main rotational shaft is inserted into the casing. A first supporting and second supporting blocks are disposed around the main rotational shaft in an axially spaced apart manner. Also, the above supporting blocks are rotatably supported by the casing through respective bearings and rigidly connected with each other. A plurality of eccentric body shafts are disposed along a circumference coaxial to the main rotational shaft. The above eccentric body shafts are supported at both the ends thereof by the first and second supporting shafts, and are rotated in an interlocking relation with the rotation of the main rotational shaft. Eccentric bodies are provided at the approximately axially central portions of the eccentric body shafts, respectively. Externally toothed gears are provided between the first and second supporting blocks, and eccentrically rotated around to the main rotational shaft through the eccentric bodies provided on the eccentric body shafts, respectively. An internal gear is fixed on the casing for internally meshing with the above externally toothed gears.

FIGS. 5 and 6 shows the conventional internally meshing planetary gear structure of this type.

In these figures, numeral 1 designates a cylindrical casing. The casing 1 has an external flange 2. The tip of an input shaft (main rotational shaft) 3 rotated by a motor (not shown) is inserted into the central portion of the casing 1.

In the casing 1, a first supporting block 4 and a second supporting block 5 are oppositely disposed in an axially spaced apart manner. These first and second supporting blocks 4 and 5 are rotatably supported around the internal periphery of the casing 1 through bearings 6a and 6b.

The second supporting block 5 (in the right side in FIG. 5) has a projection 7 (see FIG. 6) having a complex shape and projecting to the first supporting block 4 (in the left side in FIG. 5). Both the supporting blocks 4 and 5 are rigidly connected to each other by bolts 29 and pins 30 through the projection 7 having such a complex shape, thus constituting a carrier as a whole.

Also, in the casing 1, three eccentric body shafts 8 are disposed in parallel to the input shaft 3. These eccentric body shafts 8 are circumferentially spaced at equal intervals on a circumference coaxial to the input shaft 3. Both ends of each eccentric body shaft 8 are rotatably supported in eccentric body shaft bearing holes 10a and 10b of the first and second supporting blocks 4 and 5 through eccentric body shaft bearings 9a and 9b, respectively.

The end portion of each eccentric body shaft 8 on the first supporting block 4 side projects outwardly from the portion supported by the eccentric body shaft bearing 9a. Three transmission gear units 13 are mounted on the projecting portion through splines 12. In this case, the transmission gear units 13 are respectively constituted of a pair of gears for preventing backlash.

The first and second supporting blocks 4 and 5 are formed with center holes 14 and 15 at the radial centers thereof, respectively. The above input shaft 3 passes through the center holes 14 and 15. A pinion 16 meshing with the transmission gear units 13 fixed on each eccentric body shaft 8 is fixed at the tip of the input shaft 3. Accordingly, the rotation of the input shaft 3 is equally distributed to three eccentric body shafts 8 through the pinion 16 and the transmission gear units 13.

In this case, the teeth number of the each transmission gear unit 13 is specified to be larger than that of the pinion 16. Consequently, the rotation of each eccentric body shaft 8 is reduced in correspondence with the gear ratio between the transmission gear unit 13 and the pinion 16.

Two eccentric bodies 17a and 17b are axially lined-up at the approximately axially central portion of each eccentric body shaft 8. These eccentric bodies 17a and 17b are phase-shifted by 180° to each other.

On the other hand, two disk-like externally toothed gears 18a and 18b, each having an outside diameter slightly smaller than the inside diameter of the casing 1, are axially lined-up between the first and second supporting blocks 4 and 5. Each of the externally toothed gears 18a and 18b is provided with three eccentric body bearings holes 19a and 19b, through which the above eccentric body shafts 8 pass respectively. The above eccentric bodies 17a and 17b are fitted to the eccentric body shaft bearing holes 19a and 19b through eccentric body bearings 20a and 20b, respectively. Accordingly, as shown in FIG. 6, the externally toothed gears 18a and 18b are supported in the state where the center Og thereof is eccentric to the rotational center Of of the input shaft 3 by a distance $<e>$. Thus, these externally toothed gears 18a and 18b are rotated in a rolling (swaying) manner by one rotation around the rotational center Of of the input shaft 3 for each rotation of the eccentric body shaft 8.

As the above eccentric body bearings 20a and 20b, needle bearings are here used. These eccentric body bearings 20a and 20b are axially positioned by stopper plates 21 and 23, and a flange 22 provided on the eccentric body shaft 8.

Each of the above externally toothed gears 18a and 18b has circular arc or trochoid shaped external teeth 24. An internal gear 25 meshing with the externally toothed gears 18a and 18b is disposed on the outer peripheral side of the externally toothed gears 18a and 18b. The internal gear 25 is formed integrally with the casing 1 around the inner periphery of the casing 1. This internal gear 25 has internal teeth constituted of outer pins 26. In addition, the outer pins 26 are secured by a pin pressing ring 27 from the inside for preventing the outer pins 26 from slipping off.

As shown in FIG. 6, insertion openings (inserting-fit holes) 28a and 28b, each having a complex curved contour, are formed at the central portions of the external gears 18a and 18b, respectively. The projection 7 of the second supporting block 5 passes through these insertion openings 28a and 28b. Thus, in the state where the end surface of the projection 7 is closely contacted with the inner end surface of the first supporting block 4, the first and second supporting blocks 4 and 5 are rigidly connected to each other by the bolts 29 and the pins 30, thereby constituting an integral carrier.

The projection 7 is intended to mutually transmit the rotational forces applied on the first and second supporting blocks 4 and 5. The insertion openings 28a and 28b of the externally toothed gears 18a and 18b has a size and a shape enough to prevent the interference with the projection 7 even in rolling (swaying) of the externally toothed gears 18a and 18b.

Now, the function of the gear structure will be described.

First, it is here assumed that the casing 1 is fixed, and the rotational output is taken from the carrier constituted of the first and second supporting blocks 4 and 5.

As the input shaft 3 is rotated, three eccentric body shafts 8 are rotated at an equal speed in the same direction (reversed to the rotational direction of the input shaft 3) through the pinion 16 and the transmission gear units 13. As described above, two eccentric bodies 17a and 17b are provided on each of three eccentric body shafts 8. Accordingly, the eccentric bodies 17a and 17b are eccentrically rotated at an equal speed in the same direction, so that two of externally toothed gears 18a and 18b are rotated in a rolling (swaying) manner around the input shaft 3.

In this case, since the casing 1 is fixed, that is, the internal gear 25 is fixed, the externally toothed gears 18a and 18b are rolled while internally meshing with the internal gear 25 in the state where the free rotation is restricted. For example, assuming that the teeth number of the externally toothed gears 18a and 18b are specified at N, and the teeth number of the internal gear 25 is specified at (N+1), the tooth difference is one. Accordingly, the externally toothed gears 18a and 18b are shifted (rotated on its axis) by one tooth with respect to the internal gear 25 for each rotation of the eccentric body shafts 8.

This shifting, that is, the rotations of the externally toothed gears 18a and 18b are transmitted to the first and second supporting blocks 4 and 5 through the eccentric body shafts 8. Since the supporting blocks 4 and 5 are integrated with each other through the projection 7, the rotational forces respectively transmitted to the supporting blocks 4 and 5 are combined, and taken from the supporting block 4 or 5 on the output side. In addition, the supporting blocks 4 and 5 are reduced at $-1/N$ rotation for one rotation of the eccentric body shafts 8.

In the above, the function has been described assuming that the casing 1 is fixed and the output is taken from the side of the supporting block 4 or 5. However, the output may be taken from the casing 1 side, with the supporting blocks 4 and 5 being fixed. In this case, a counter-member is connected to the external flange 2 provided on the casing 1. With this arrangement, the reduced output is taken from the casing 1 side at the identical speed and in the reverse rotation to the case being taken from the side of the above supporting block 4 or 5.

Thus, the reduced rotational output may be taken from the side of the supporting block 4 or 5, with the casing 1 side being fixed, or may be taken from the casing 1 side, with the supporting blocks 4 and 4 being fixed. The above two types of the gear structures are adapted for reduction gears. In terms of the type of taking the output, the former is called as a carrier rotation type and the latter is called as a casing rotation type.

The conventional structure shown in FIG. 5 is assumed as the casing rotation type. Accordingly, a cover 31 is provided to the opening portion of the casing 1 on the side of the transmission gear units 13.

Incidentally, the gear structure of the casing rotation type or the carrier rotation type can be used as a step-up gear by reversing a relationship between the input and the output.

Next, the conventional gear structure of the carrier rotation type will be briefly described with reference to FIG. 7.

In the carrier rotation type, generally, an output shaft is provided integrally with the supporting block which is on the opposite side to the input shaft. Thus, the reduced rotational output is taken from the output shaft. However, in the conventional structure, the counter-member P on the output side is directly connected to the first supporting block 4. In this gear structure, the reduction mechanism is almost similar to that shown in FIGS. 5 and 6, except that the projection 7 for connecting both the supporting blocks 4 and 5 to each other is provided not on the second supporting block 5 but on the first supporting block 4, and the cover 31 is omitted. The main difference lies in that screw holes 32 are formed on the outer surface of the first supporting block 4, and thus the counter-member P is mounted by screwing bolts 33 in these screw holes 32.

In the above two gear structures, for connecting the first and second supporting blocks 4 and 5 to each other, there is used the projection 7 formed integrally with the first supporting block 4 or the second supporting block 5. However, in U.S. Pat. No. 3,129,611, carrier pins (cage bars) are used in place of the projection 7 for connection. In each of the carrier pins, both ends thereof are rigidly fixed on the first and second supporting blocks (disks) for connecting both the supporting blocks, thus constituting a carrier (cage).

By the way, as shown in FIG. 7, in the case that the counter-member P is directly fixed on the supporting block 4 by the bolts 33 for taking the output from the supporting block 4, the number of the fixing bolts 33 must be increased for taking the high rotational force. Notwithstanding, if the type of taking the output in the above manner is adapted to the above-described gear structure of connecting the supporting blocks with the above carrier pins, it is difficult to secure a large number of the screw holes for screwing bolts because of the obstruction due to the presence of the carrier pins.

Namely, when the first and second supporting blocks are connected with the carrier pins, the space for forming the screw holes is reduced. Consequently, it becomes difficult to increase the number of the screw holes. Particularly, in the gear structure of disposing a plurality of the eccentric body shafts and of rotating them with respective transmission gear units, it becomes further difficult to secure the space for forming the screw holes because of the presence of the eccentric body shafts and the transmission gear units. Accordingly, it is limited to increase the number of the screw holes, which makes it impossible to increase the number of the bolts and hence to increase the transmission torque.

Also, in each of the above gear structures, eccentric body bearings 20a and 20b are interposed between the outer peripheries of the eccentric bodies 17a and 17b and the inner peripheries of the eccentric body bearing holes 19a and 19b of the externally toothed gears 18a and 18b, respectively.

In the conventional gear structure shown in FIG. 5 or 7, the stopper plate 21, the flange 22 and the stopper plate 23 are used for carrying out the axially positioning of the eccentric body bearings 20a and 20b. Accordingly, there is arisen a problem of lengthening the axial dimension of the machine by the spaces therefor, and increasing the cost for fabricating the stopper plates.

Also, in the gear structure of U.S. Pat. No. 3,129,611, the outer ring of the eccentric body bearing is press-fitted in the bearing hole formed on the externally toothed gear for restricting the axial movement of the bearing. However, it is difficult to remove the bearing, which deteriorates the disassembling performance.

SUMMARY OF THE INVENTION

Accordingly, an object of the present invention is to provide an internally meshing planetary gear structure capable of increasing the number of bolts for fixing a counter-member, thereby making it possible to increase the transmission torque.

Another object of the present invention is to provide an internally meshing planetary gear structure capable of reducing the number of stopper plates, while securing the preferable disassembling performance.

In a preferred mode of the present invention, there is provided such an internally meshing planetary gear structure as follows: A casing is provided, and the tip of a main rotational shaft is inserted into the casing. A first supporting and second supporting blocks are disposed around the main rotational shaft in an axially spaced apart manner, and are rotatably supported by the casing through respective bearings and rigidly connected with each other. A plurality of eccentric body shafts are respectively disposed along a circumference coaxial to the main rotational shaft, and are rotatably supported at both the ends thereof by the first and second supporting blocks, and rotated in interlocking relation with the rotation of the main rotational shaft. Eccentric bodies are respectively provided at the approximately axially central portions of the eccentric body shafts. Externally toothed gears are provided between the first and second supporting blocks, and are eccentrically rotated around the main rotational shaft through the eccentric bodies provided on the eccentric body shafts. An internal gear is fixed on the casing for internally meshing with the external toothed gears. In the above structure, the first and second supporting blocks are rigidly connected to each other by carrier pins passing through inserting-fit holes formed on the externally toothed gears. Further, the carrier pins are mounted in such a manner that the end surfaces thereof are exposed on a counter-member mounting surface of the first supporting block positioned on the counter-member side, so that screw holes for screwing counter-member fixing bolts are formed on both the end surface and the counter-member mounting surface of the first supporting block.

In the gear structure of the present invention, the first and second supporting blocks are rigidly connected to each other by the carrier pins. This eliminates the necessity of providing the conventional projection having a complex shape. Accordingly, the structure constituted of both the supporting blocks and the shapes of the insertion openings (inserting-fit holes) of the externally toothed gears are simplified, resulting in the simplified machining. Further, the end surfaces of the carrier pins are exposed on the counter-member mounting surface of the first supporting block and the screw holes are formed on the end surfaces. Consequently, it is possible to increase the number of the bolts for fixing the counter-member, and to forcibly connect the counter-member with the first supporting block.

Also, the transmission gears are disposed adjacent to the externally toothed gear, and the axial positioning of the eccentric body bearing is carried out on the side surface thereof. This eliminates the necessity of providing the stopper plate separately. Thus, the number of the parts can be reduced, and it is unnecessary to carry out the positioning by press-fitting the bearing. Therefore, it is possible to slightly shorten the axial dimension and hence to make the machine compact. Also, it is possible to reduce the cost by omitting the stopper plates. Further, since the necessity of carrying out the positioning by press-fitting the bearing is eliminated, it is possible to secure the preferable re-assembling performance.

BRIEF DESCRIPTION OF THE DRAWINGS

The above and other objects, features and advantages of the present invention will be more apparent from the following description of the invention taken in conjunction with the accompanying drawings, wherein like reference characters designate the same or similar parts, and wherein.

DESCRIPTION OF THE PREFERRED EMBODIMENT

Hereinafter, one embodiment of the present invention will be described in detail with reference to the accompanying drawings.

Figure 1:
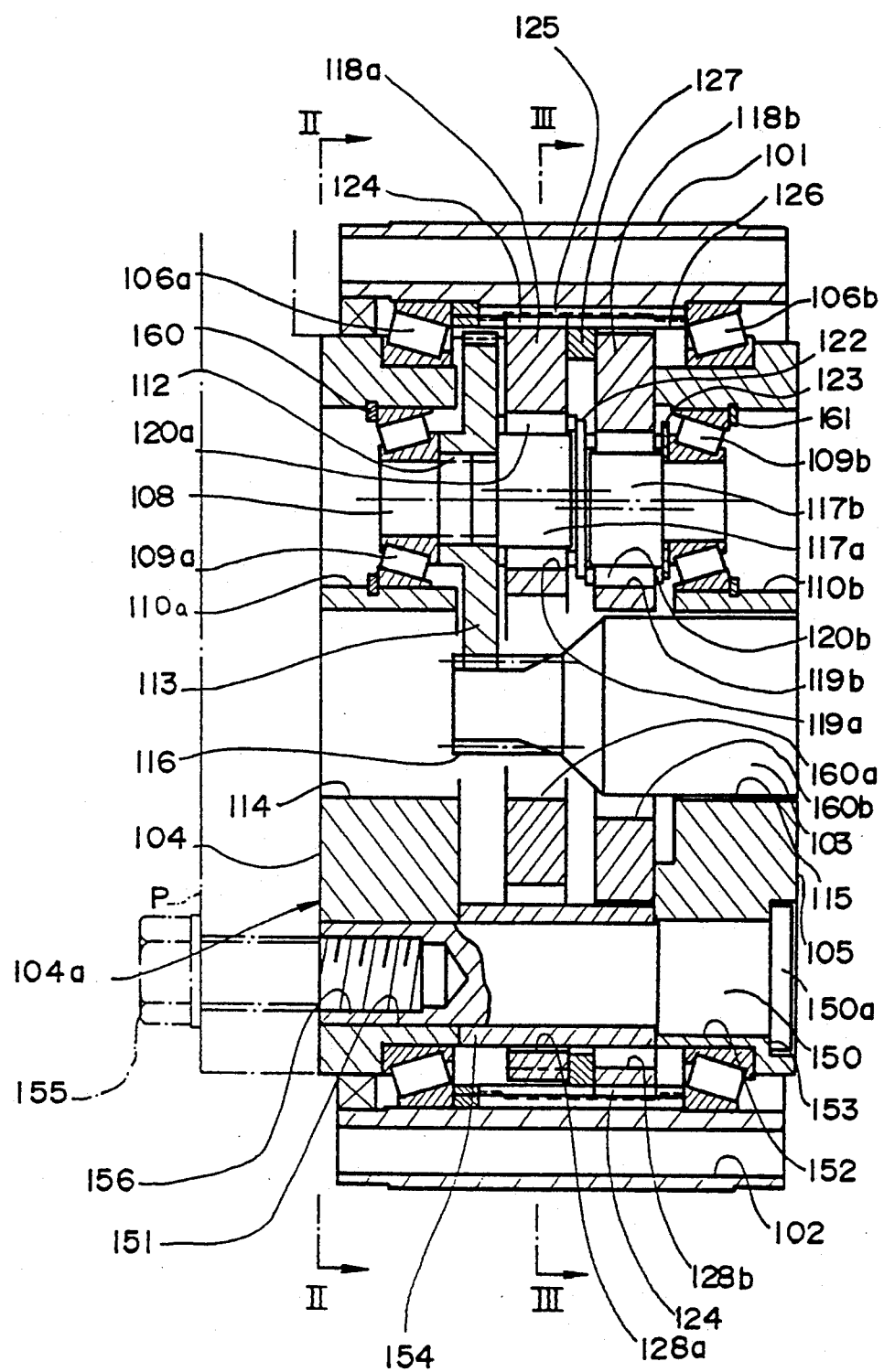
FIG. 1 is a transverse sectional view of an internally meshing planetary gear structure according to one embodiment of the present invention.

Referring to FIG. 1, numeral 101 indicates a cylindrical casing. The casing 101 has a plurality of bolt insertion holes 102 axially passing through the cylinder wall thereof. The tip of an input shaft (main rotational shaft) 103 rotated by a motor (not shown) is inserted to the central portion of the casing 101 from the right side in the figure.

In the casing 101, a first supporting block (on the left side in the figure) 104 and a second supporting block 105 (on the right side in the figure), which are respectively formed thick disk shapes, are oppositely disposed in an axially spaced apart manner. The outer end surface (left end surface) of the first supporting block 104 slightly projects from the casing 104 for serving as a counter-member mounting surface 104a. These first and second supporting members 104 and 105 are supported by bearings 106a and 106b rotatably around the inner periphery of the casing 101, respectively.

Both the supporting blocks 104 and 105 are rigidly connected to be integrated with each other by three carrier pins 150 disposed in parallel to the input shaft 103, thus constituting a carrier as a whole. The carrier pins 150 are disposed near the outer periphery of each of the supporting blocks 104 and 105 in such a manner as to be circumferentially spaced at equal intervals on the circumference coaxial to the input shaft 101 (see FIGS. 2 and 3).

Carrier pin holding holes 151 and 152 for inserting each carrier pin 150 are formed on the first and second supporting blocks 104 and 105, respectively. Each of the carrier pin holding holes 152 of the second supporting block 105 has a counterbore portion 153 on the outer end surface side. The carrier pin 150 having a flange portion 150a at its head is inserted from the side of the carrier pin holding hole 152 of the second supporting block 105. Thus, by bringing the flange portion 150a thereof in contact with the bottom surface of the counterbore portion 153, the carrier pin 150 is axially positioned with respect to the second supporting block 105.

Also, pipe-like carrier spacers 154 are disposed between the first and second supporting blocks 104 and 105. The tip of each carrier pin 150 passes through each carrier spacer 154 and inserted in each carrier pin holding hole 151 of the first supporting block 104. The carrier spacer 154 is freely fitted around the outer periphery at the axial intermediate portion of the carrier pin 150. Both end surfaces of each carrier spacer 154 are closely contacted with the first and second supporting blocks 104 and 105, respectively. Consequently, the interval between both the supporting blocks 104 and 105 are kept constant.

The tip surface of each carrier pin 150 is exposed on the counter-member mounting surface 104a of the first supporting block 104. At the center of this exposed tip surface, a screw hole 156 to which each counter-member fixing bolt 155 is screwed. The bolt 155 passing through the bolt insertion hole of the counter-member P is screwed in the screw hole 156. Thus, the counter-member P is connected to the carrier pins 150, and therefore, the first and second supporting blocks 104 and 105 are rigidly connected to each other through the carrier spacers 154 simultaneously.

Figure 2:
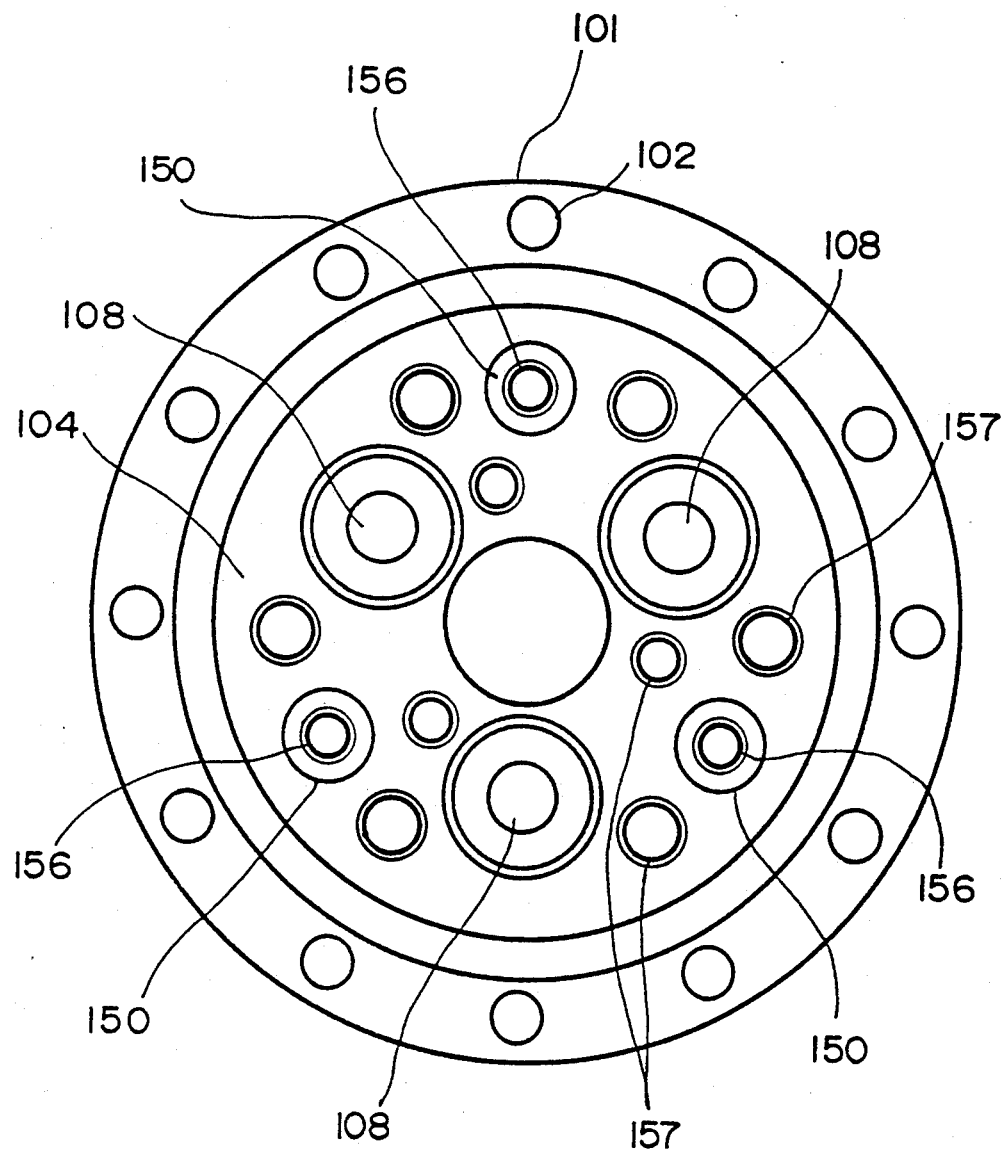
FIG. 2 is a view taken on the line II—II of FIG. 1.
Figure 3:
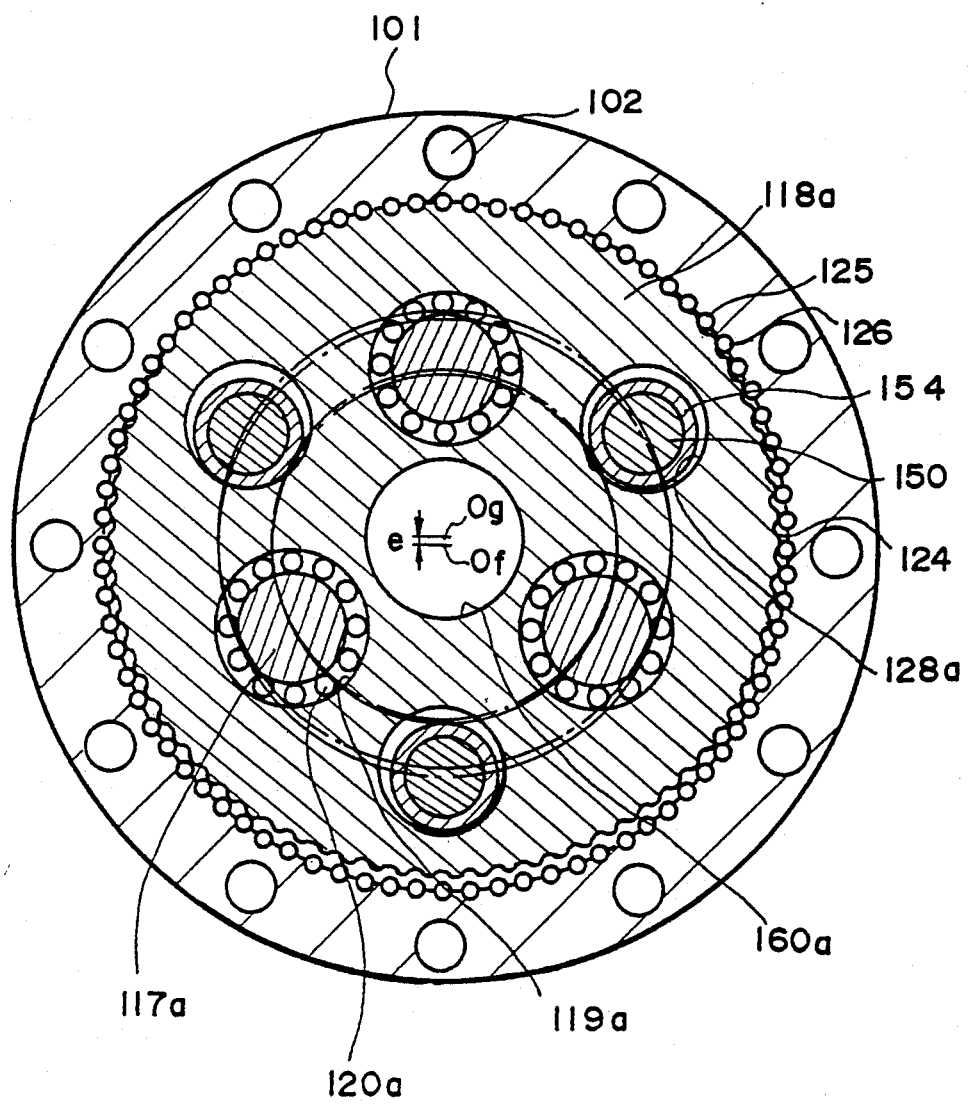
FIG. 3 is a cross-sectional view taken along the line III—III of FIG. 1.

Also, in the casing 1, three eccentric body shafts 108 are disposed in parallel to the input shaft 103. These eccentric body shafts 108 are circumferentially disposed along a circumference coaxial to the input shaft 3 in an equally spaced apart manner. Also, as shown in FIGS. 2 and 3, the eccentric body shafts 108 are positioned on the intermediate portions among the carrier pins 150, respectively. Both the end portions of each eccentric body shaft 108 are rotatably supported by eccentric body shaft bearing holes 110a and 110b of the first and second supporting blocks 104 and 105 through eccentric body bearings (needle bearings) 109a and 109b.

Around each eccentric body shaft 108 on the first supporting block 104 side, a transmission gear 113 is mounted through a spline 112 at the position close to the axial intermediate portion from the portion supported by the above eccentric body shaft bearing 109a.

Center holes 114 and 115 are formed on the first and second supporting blocks 104 and 105 at the radial centers thereof, respectively. The above input shaft 103 is inserted in the center holes 114 and 115 from the side of the second supporting block 105.

The tip of the input shaft 103 is positioned to be inserted slightly within the center hole 114 of the first supporting block 104. A pinion 116 meshing with transmission gears 113 respectively fixed on the above eccentric body shafts 108 is fixed on the tip of the input shaft 103. Accordingly, the rotation of the input shaft 103 is equally distributed to three eccentric body shafts 108 through the pinion 116 and the transmission gears 113. In this case, the teeth number of each transmission gear 113 is larger than that of the pinion 116. Thus, each eccentric body shaft 108 is rotated while being reduced according to the gear ratio between the transmission gear 113 and the pinion 116.

Two eccentric bodies 117a and 117b are axially lined up at the axially central portion of each eccentric body shaft 108. These eccentric bodies 117a and 117b are phase-shifted to each other at 180 degrees.

On the other hand, two disk-like externally toothed gears 118a and 118b, each having an outside diameter smaller than the inside diameter of the casing 101, are axially lined up between the first and second supporting blocks 104 and 105. Three eccentric body bearing holes 119a and 119b, through which the above eccentric body shafts 108 pass respectively, are provided on each of the externally toothed gears 118a and 118b. The above eccentric bodies 117a and 117b are fitted to the eccentric body bearing hole 119a and 119b through the eccentric body bearings 120a and 120b, respectively. With this arrangement, as shown in FIG. 3, the externally toothed gears 118a and 118b are supported in the state where the center Og thereof is eccentric to the rotational center Of of the input shaft 103 by a distance e. Thus, the externally toothed gears 118a and 118b are rotated in a rolling (swaying) manner by one rotation around the center Of of the input shaft 103 for each rotation of the eccentric body shafts 108.

The externally toothed gears 118a and 118b are thus disposed. Consequently, between both the supporting blocks 104 and 105, the transmission gears 113 and the externally toothed gear 118a, and the externally toothed gear 118b are adjacently lined up in this order from the first supporting block 104 side to the second supporting block 105 side.

The eccentric body shaft bearing 109a for supporting the eccentric body shaft 108 on the left side in FIG. 1 and the transmission gear 113 are put between the end surface of the eccentric body 117a on the left side and a stopper ring 160 engaging with the inner periphery of the eccentric body shaft bearing hole 110a of the first supporting block 104. Thus, the eccentric body shaft bearing 109a and the transmission gear 113 are positioned on the eccentric body shaft 108.

Also, needle bearings are here used as the above eccentric body shaft bearings 120a and 120b. The axial positioning of the eccentric body shaft bearings 120a and 120b is carried out in the following:

Namely, as shown in FIG. 1, in the eccentric body bearing 120a on the left end side near the first supporting block 104, the left end side thereof is directly positioned by the side surface of the above transmission gear 113, and the right end side thereof is positioned by the flange 122 provided between both the eccentric bodies 117a and 117b. Also, in the eccentric body bearing 120b near the second supporting block 105, the left end side thereof is positioned by the above flange 122 provided between both the eccentric bodies 117a and 117b, and the right end side thereof is positioned by the stopper plate 123.

The stopper plate 123 is pressed by the eccentric body shaft bearing 109 for supporting the eccentric body 108. The eccentric body shaft bearing 109a is pressed by the stopper ring 161 engaging with the inner periphery of the eccentric body shaft bearing hole 110a of the second supporting block 105.

Each of the externally toothed gears 118a and 118b has the external teeth formed in a circular arc or trochoid shape. The internal gear 125 meshing with the externally toothed gears 118a and 118b is disposed on the outer peripheral side of the externally toothed gears 118a and 118b. The internal gear 125 is formed integrally with the casing 101 around the inner periphery thereof. The internal gear 125 has internal teeth constituted of outer pins. In addition, the outer pins 126 are pressed by a pin-pressing ring 127 from the inside for preventing them from slipping off.

The center holes 16a and 160b, through which the input shaft 103 passes, are formed at the centers of the external gears 118a and 118b, respectively. Also, the inserting-fit holes 128a and 128b are formed at the positions corresponding to each carrier pin 150 in the external gears 118a and 118b. The carrier pin 150 and the carrier spacer 154 pass through the inserting-fit holes 128a and 128b.

The carrier pins 150 are intended to transmit the rotational force applied to the second supporting block 105 to the first supporting block 104. Each of the inserting-fit holes 128a and 128b of the externally toothed gears 118a and 118b is formed in a circular shape having a size enough to prevent the interference with the carrier pin 150 and the carrier spacer 154 even on rolling of the externally toothed gears 118a and 118b.

Also, as shown in FIG. 2, on the counter-member mounting surface of the first supporting block 104, a plurality of counter-member fixing screw holes 157 are formed, in addition to the screw holes 156 on the tip surface of the carrier pin 150. By screwing the fixing bolts 155 to a plurality of the screw holes 156 and 157, the counter-member is forcibly connected.

Next, the function of the gear structure of the present invention will be described below.

In the same manner as described in the conventional structures, the externally toothed gears 118a and 118b are rotated in a rolling (swaying) manner together with the rotation of the input shaft 103. At the same time, the external pins 126 equivalent to the internal teeth of the internal gear 125 mesh with the externally toothed gears 118a and 118b. Thus, the rotation of the input shaft 103 becomes the reduced rotation of the externally toothed gears 118a and 118b.

The rotations of the externally toothed gears 118a and 118b are transmitted to the first and second supporting blocks 104 and 105 through three eccentric body shafts 108. The rotational force applied to the second supporting block 105 is transmitted to the first supporting block 104 through the carrier pins 150. The rotational force thereof is transmitted from the first supporting block to the counter-member P connected thereto.

In this embodiment, the first and second supporting blocks 104 and 105 are connected to each other by the carrier pins 150. Accordingly, it is unnecessary to form the conventional projection having the complex shape integrally with the supporting block. Also, the inserting-fit holes 128a and 128b of the externally toothed gears 118a and 118b, through which the carrier pins 150 pass, may be formed in a simple circular shape. Thus, the working cost can be reduced.

Also, the counter-member fixing screw hole 156 is provided on the end surface of the carrier pin 150 exposed on the counter-member mounting surface of the first supporting block 104. This makes it possible to increase the number of the counter-member fixing screw holes. Consequently, it is possible to increase the number of the counter-member fixing bolts and hence to increase the capacity of transmission torque.

Further, in this embodiment, the transmission gears 113 having large areas are disposed on the inside of the first supporting block 104 (on the opposed side to the counter-member P). This makes it possible to remarkably increase the actual area of the counter-member mounting surface 104a of the first supporting block 104 as compared with the conventional structures. Accordingly, it is possible to increase the number of the screw holes 157 connected to the counter-member P.

Also, both the supporting blocks 104 and 105 are rigidly connected to each other by fixing the carrier pins 150 inserted from one side at the other side by bolts. Thereby, the carrier (constituted of both the supporting blocks 104 and 105, the carrier pins 105 and the carrier spacers 154) can be disassembled, and also can be reassembled with easy. Further, both the supporting blocks 104 and 105 are axially positioned only by fitting the pipe-like carrier spacers 154 to the carrier pins 150. This makes it possible to easily enhance the positioning accuracy with the simple structure, and to easily keep the above interval constant even when the assemblies are repeated.

Also, by use of each carrier pin 150 having the flange portion at the head, it is possible to simply position the carrier pin 150 itself only by inserting the carrier pin 150 to the supporting blocks from one side.

Further, the supporting blocks 104 and 105 are rigidly connected to each other by mounting the counter-member P in the screw holes 156 of the carrier pins 150 by the bolts 155. Accordingly, it is unnecessary to rigidly connecting both the supporting blocks 104 and 105 to each other independently beforehand, which eliminates the unnecessary bolts. Thus, it is possible to reduce the number of the parts and to make the whole structure compact.

In this embodiment, the transmission gears 113 are disposed adjacently to the externally toothed gear 118a, and the axial positioning of the eccentric body bearing 120a is carried out on the side surface thereof. This eliminates the necessity of providing the stopper plate separately. Thus, the number of the parts can be reduced, and it is unnecessary to carry out the positioning by press-fitting the bearing. Therefore, it is possible to slightly shorten the axial dimension and hence to make the machine compact. Also, it is possible to reduce the cost by omitting the stopper plates. Further, since the necessity of carrying out the positioning by press-fitting the bearing is eliminated, it is possible to secure the preferable re-assembling performance.

Figure 4:
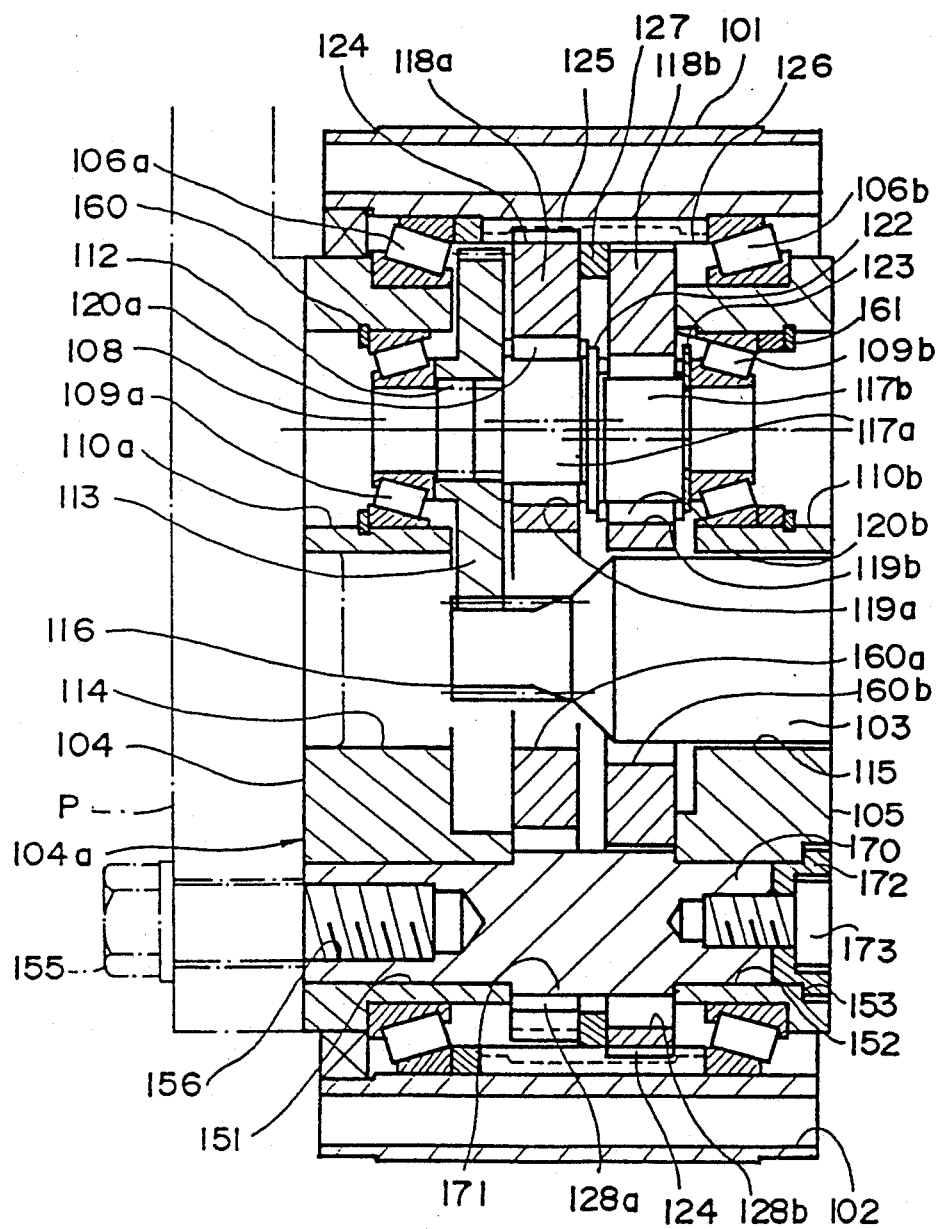
FIG. 4 is a sectional view being equivalent to FIG. 1 showing another embodiment in which the construction near carrier pins is changed.
Figure 5:
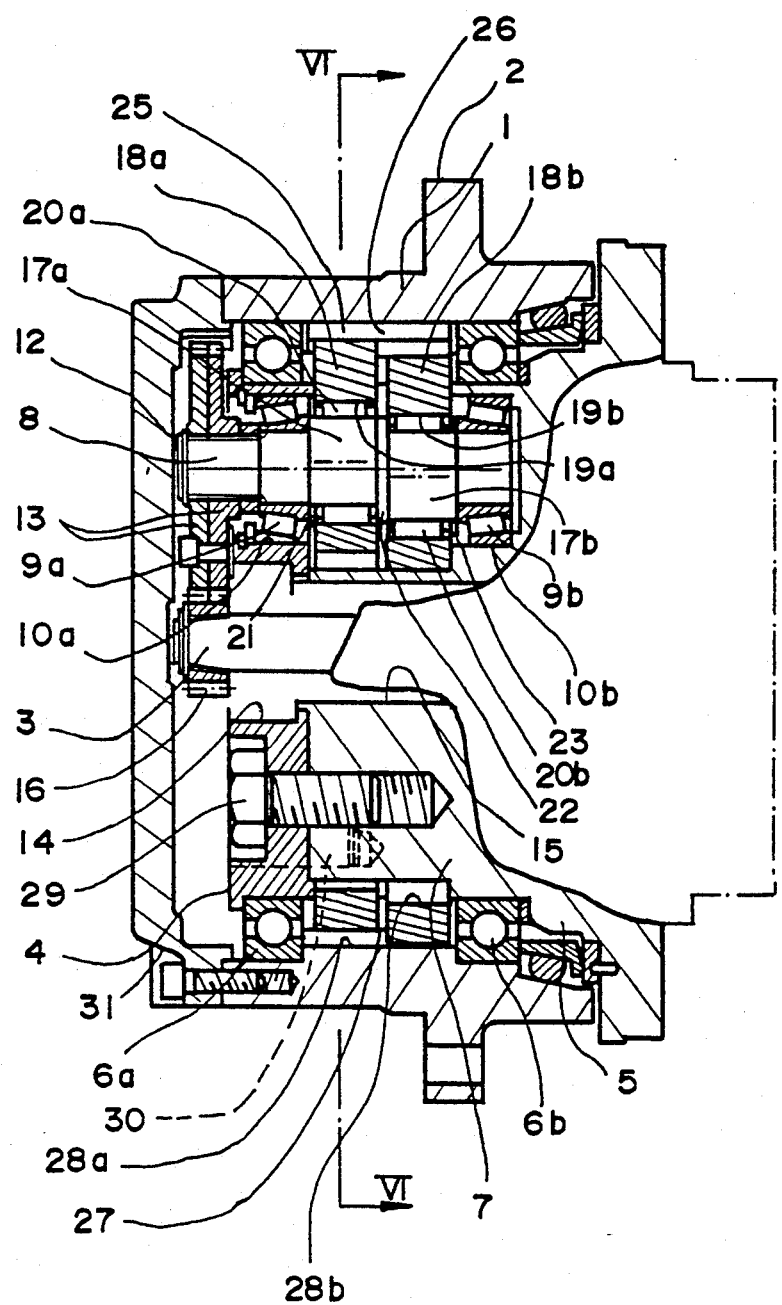
FIG. 5 is a transverse sectional view showing one example of the conventional internally meshing planetary gear structures.
Figure 6:
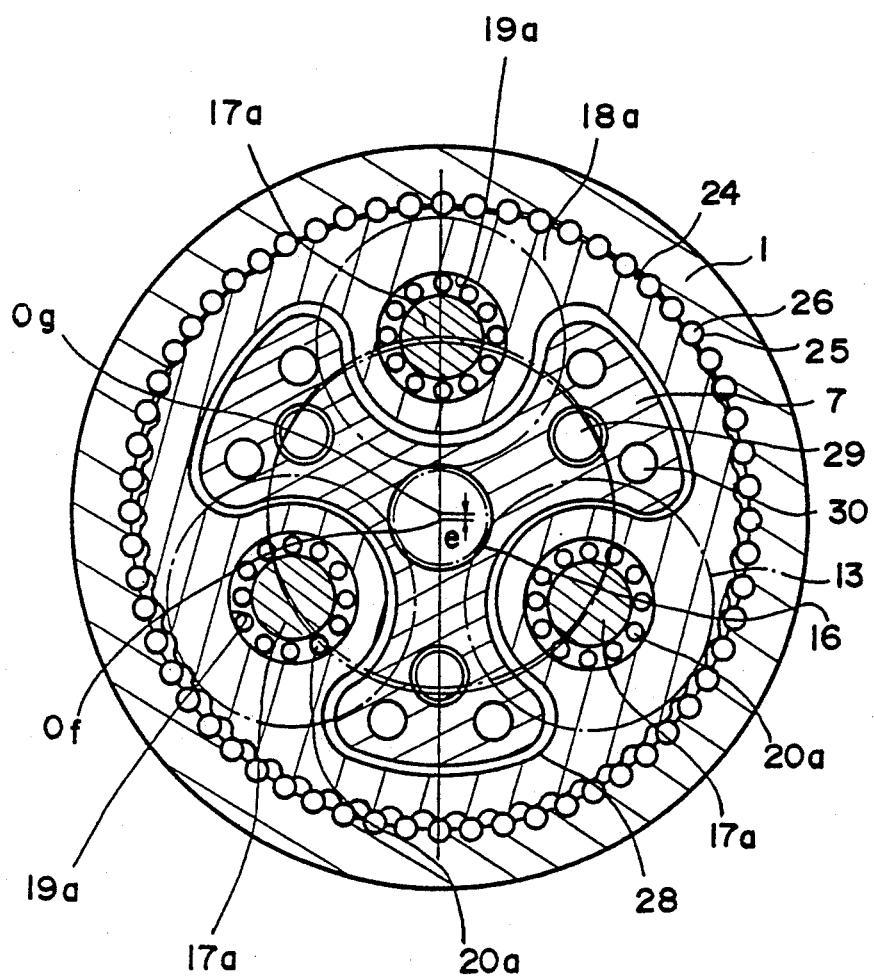
FIG. 6 is a cross sectional view taken along the line VI—VI of FIG. 5.
Figure 7:
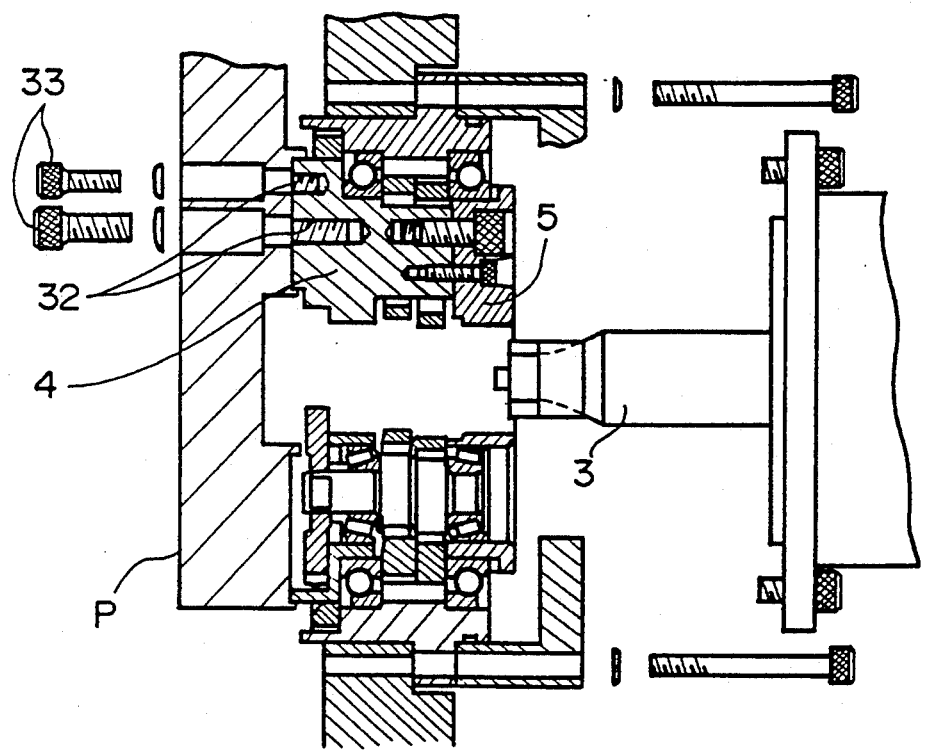
FIG. 7 is a transverse sectional view showing the other example of the conventional internal meshed planetary gear structures.

In this embodiment, the carrier pin 150 has the flange for inserting it from the second supporting block 105, and the interval between the first and second supporting blocks 104 and 105 is defined by the separated carrier spacer 154; however, the above may be so constructed as shown in FIG. 4.

In FIG. 4, the carrier pin 170 has a protruding portion 171. The protruding portion 171 serves as the carrier spacer 154 in the above-described embodiment. The carrier pin 170 achieves the same function as the flange in the above-described embodiment (the function of preventing the movement of the carrier pin in the left side in the figure) with an intermediate body 172 and bolts 173.

The other constructions are similar to the above-described embodiment, and the similar functional effects can be obtained. Accordingly, the same parts are indicated by the same reference numerals, and the explanation thereof is omitted.

As described above, in either embodiment, the screw holes for screwing the counter-member fixing bolts are provided on the ends surface of the carrier pins. Accordingly, it is possible to increase the number of the screw holes, and hence to increase the number of the fixing bolts, thus increasing the capacity of the transmission torque. Also, the counter-member can be directly connected to the carrier pins for connecting both the supporting blocks, so that the rotational force applied on the second supporting block can be directly taken through the carrier pins.

Further, it is possible to reduce the number of the stopper plates for the axial positioning of the eccentric body bearings. This makes it possible to reduce the cost and to shorten the axial dimension of the machine for making the machine compact. Also, it is unnecessary to carry out the positioning by press-fitting the bearing, thereby making it possible to secure the preferable disassembling performance.

What is claimed is:

1. An internally meshing planetary gear structure for mounting a counter-member, which comprises:

a casing;

a main rotational shaft having the tip inserted into said casing;

a first supporting block and a second supporting block which are disposed around said main rotational shaft in an axially spaced apart manner, and which are rotatably supported by said casing through respective bearings and rigidly connected with each other, the first supporting block having a counter-member mounting surface for mounting said counter-member;

a plurality of eccentric body shafts, which are respectively disposed along a circumference coaxial to said main rotational shaft, and which are rotatably supported at both the ends thereof by said first and second supporting blocks and rotated in interlocking relation with the rotation of said main rotational shaft;

eccentric bodies respectively provided at the approximately axially central portions of said eccentric body shafts;

externally toothed gears, which are provided between said first and second supporting blocks, and which are eccentrically rotated around said main rotational shaft through said eccentric bodies provided on said eccentric body shafts; and an internal gear fixed on said casing and internally meshing with said external toothed gears;

said structure further comprising:

carrier pins for connecting said first and second supporting blocks rigidly to each other, and mounted in such a manner that the end surfaces thereof are exposed on said counter-member mounting surface of said first supporting block positioned on said counter-member side;

inserting-fit holes formed on said externally toothed gears and through which said carrier pins pass respectively; and screw holes and counter-member fixing bolts for mounting said counter-member, said screw holes being formed on both said end surface of said carrier pins and said counter-member mounting surface of said first supporting block.

2. An internally meshing planetary gear structure for mounting a counter-member, which comprises:

a casing;

a main rotational shaft having the tip inserted into said casing;

a first supporting block and a second supporting block, which are disposed around said main rotational shaft in an axially spaced apart manner, and which are rotatably supported by said casing through respective bearings and rigidly connected with each other, the first supporting block having a counter-member mounting surface for mounting said counter-member;

a plurality of eccentric body shafts, which are respectively disposed along a circumference coaxial to said main rotational shaft, and which are rotatably supported at both the ends thereof by said first and second supporting blocks and rotated in interlocking relation with the rotation of said main rotational shaft;

eccentric bodies respectively provided at the approximately axially central portions of said eccentric body shafts;

externally toothed gears, which are provided between said first and second supporting blocks, and which are eccentrically rotated around said main rotational shaft through said eccentric bodies provided on said eccentric body shafts; and an internal gear fixed on said casing and internally meshing with said external toothed gears;

said structure further comprising:

a pinion fixed on the side of said main rotational shaft;

transmission gears respectively fixed on said eccentric body shafts for rotating said eccentric body shafts interlocking with said main rotational shaft in a meshing engagement with said pinion fixed on the side of said main rotational shaft;

wherein said externally toothed gears are formed with eccentric body bearing holes, to which said eccentric bodies are rotatably fitted through eccentric body bearings respectively, and are thus eccentrically rotated around said main rotational shaft; and said transmission gears are disposed adjacently to said externally toothed gears obstructing axial movement of said eccentric body bearings by the side surfaces thereof.

* * * * *